United States Patent [19]

Schaefer

[11] 4,170,774
[45] Oct. 9, 1979

[54] AMPLITUDE SELECTED PHASE INTERFEROMETER ANGLE MEASURING RADAR

[75] Inventor: Carl F. Schaefer, Westport, Conn.

[73] Assignee: United Technologies Corporation, Hartford, Conn.

[21] Appl. No.: 219,775

[22] Filed: Jan. 24, 1972

[51] Int. Cl.² ............................ G01S 3/22; G01S 3/32; G01S 9/22
[52] U.S. Cl. ............................ 343/16 M; 343/113 R
[58] Field of Search .......................... 343/16 M, 113 R

[56] References Cited

U.S. PATENT DOCUMENTS

| 3,165,740 | 1/1965 | Stoney | 343/16 M |
| 3,239,836 | 3/1966 | Chubb et al. | 343/16 M X |
| 3,309,701 | 3/1967 | Bollinger et al. | 343/16 M X |
| 3,317,910 | 5/1967 | Hausz | 343/16 M X |
| 3,665,481 | 5/1972 | Low | 343/113 R |
| 3,824,595 | 7/1974 | Hall | 343/113 R |

*Primary Examiner*—Malcolm F. Hubler
*Attorney, Agent, or Firm*—M. P. Williams

[57] ABSTRACT

A phase interferometer elevation angle measurement radar has its antennas tilted slightly relative to each other so as to detect differences in amplitude from ground return signals; the phase difference in signals (normally utilized as an indication of depression angle below boresight in an interferometer radar) is checked for a positive rate of change; it is then compared against amplitude differences and is accepted as valid for use in generating an elevation angle only if within prescribed limits thereof. This resolves ambiguity in phase which results from a wide spread of antennas with respect to the wavelength of the radar.

8 Claims, 2 Drawing Figures

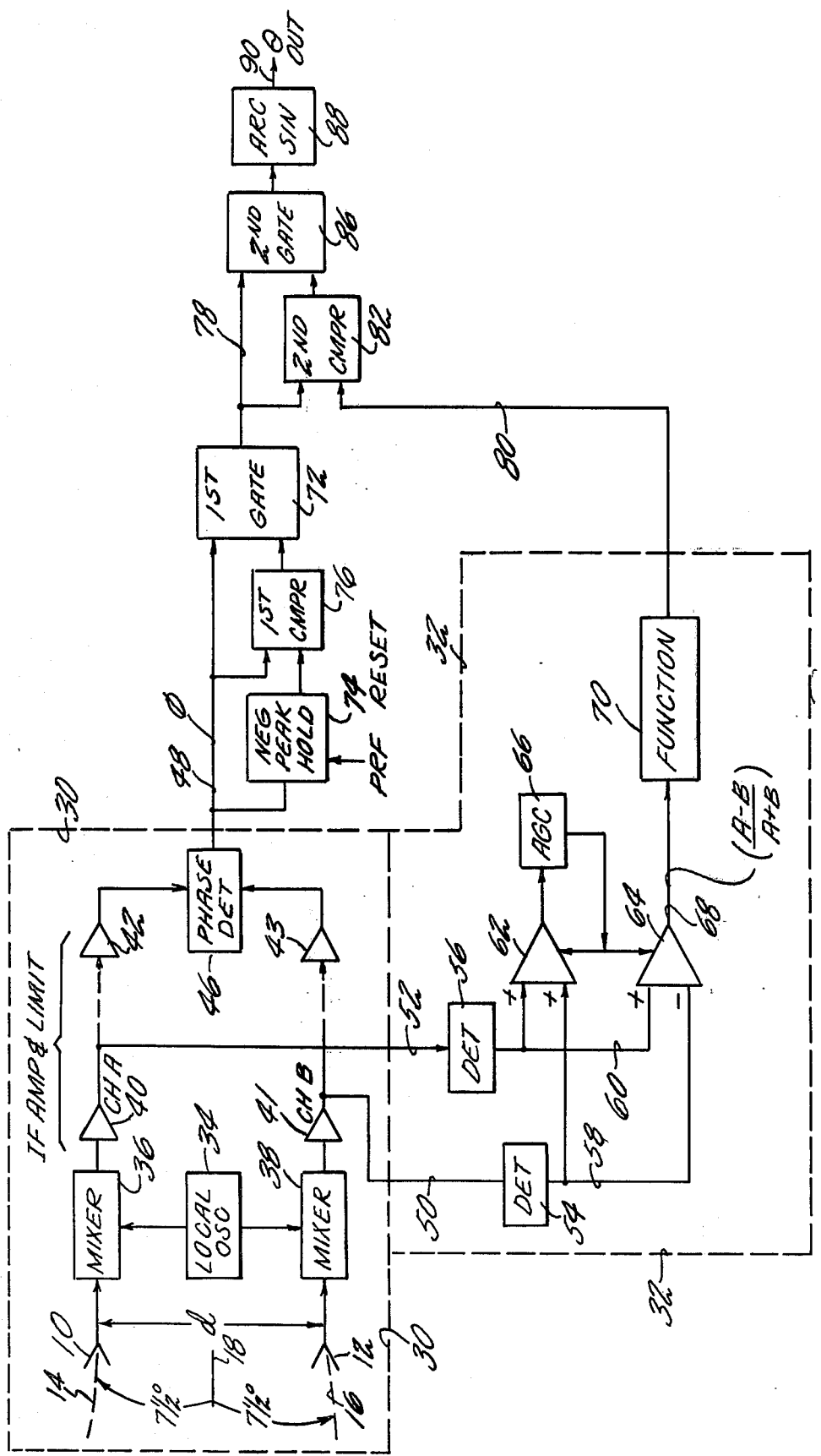

AMPLITUDE SELECTED PHASE INTERFEROMETER ANGLE MEASURING RADAR

BACKGROUND OF THE INVENTION

1. Field of Invention

This invention relates to phase interferometer radars, and more particularly to means for resolving the ambiguity in interferometer elevation angle measurement.

2. Description of the Prior Art

One type of phase interferometer radar known to the prior art measures elevation angle to terrain as a function of range ahead of an aircraft so as to provde a profile of the terrain over which the aircraft will fly. This is done by measuring the instantaneous difference in phase between the energy received in two antennas which are displaced relative to each other in a direction perpendicular to the boresight (essentially vertical in this case).

The received energy is that portion of a short pulse, transmitted from either a separate antenna or one or both of the receiving antennas, which is reflected by the terrain. The time of arrival is a measure of the slant range to that portion of the terrain from which the reflected energy is received and the corresponding phase difference is a measure of the elevation angle.

The relationship between phase angle and elevation angle is $$\phi = 2\pi d/\lambda \sin \theta$$

where
- $\phi$ = phase angle in radians
- $\lambda$ = wavelength
- $\theta$ = elevation angle relative to boresight in radians
- d = distance between the two antennas
- $d\phi/d\theta = 2\pi d/\lambda \cos \theta$ If the limits of phase angle measurement are $\pm\pi$ and $d/\lambda = \frac{1}{2}$, then the corresponding limits of $\theta$ are $\pm 90°$. Assuming that the antennas receive no energy from angles greater than $90°$, then in this case there would be a unique relationship between phase angle with respect to elevation angle. The rate of change of phase angle with respect to elevation angle would be $\pi$ at the boresight and would be zero at the extremes.

In practice the range of elevation angles which is of interest is much less than $\pm 90°$, and in order to achieve maximum accuracy of measurement it is desirable to have as large a scale factor, or rate of change of phase angle with respect to elevation angle as practicable. To achieve this, the separation of the antennas must be greater than one wavelength. For example, in one known radar $d/\lambda = 1.44$ and therefore $$\phi = 2.88\pi \sin \theta$$

$$\phi = \pm\pi \text{ when } \sin \theta = \pm 1/2.88$$

or $$\theta = \pm 20.3 \text{ degrees}$$

If energy is received from an elevation angle beyond these limits, its direction will be indistinguishable by phase measurement alone from energy coming from a point within the limits. For example, if $\sin \theta = 2/2.88$ or $\theta = -44$ degrees, then $\phi = -2\pi$ which is indistinguishable from $\phi = 0$.

Techniques known to the art for accepting some data as coming from within the desired range of elevation angles and rejecting other data as coming from outside that range, are complex logical processes which rely on either detecting the "flip" when the phase angle changes from $+\pi$ to $-\pi$ or on some assumptions regarding the terrain. Such methods are not completely reliable for all conditions and there are some situations in which terrain actually more than 20.3 degrees above the boresight (for instance) is made to appear considerably below boresight.

SUMMARY OF INVENTION

The object of the present invention is to provide improved and simplified resolution of ambiguity in elevation angle determined by phase interferometry.

According to the present invention, the elevation antenna patterns of a phase interferometer radar are tilted with respect to each other in the plane of elevation angle measurement so that the relative signal amplitudes in the two respective channels vary as a function of direction of the return signals and therefore comprise an auxiliary function of target elevation angle, the phase difference between the two signals which bears a positive relationship to elevation angle is compared with a function of the amplitude difference, and is accepted as being within a correct range of possible elevation angles and used to generate elevation angle if it differs from the amplitude function only within prescribed limits, and is otherwise rejected.

The present invention avoid reliance upon receiving energy during a change in phase from $+\pi$ to $-\pi$ and is not dependent upon any assumptions regarding the terrain. The present invention is relatively simple and completely accurate and reliable.

Other objects, features and advantages of the present invention will become more apparent in the light of the following detailed description of a preferred embodiment thereof, as illustrated in the accompanying drawing.

BRIEF DESCRIPTION OF THE DRAWING

FIG. 2 is a simplified schematic block diagram of that portion of a phase interferometer radar employing an embodiment of the present invention.

DESCRIPTION OF THE PREFERRED EMBODIMENT

Referring now to FIG. 2, a pair of radar receiver channels designated as channel A and channel B, each include a respective receiving antenna 10, 20, separated by a distance d which is more than one wavelength. In accordance with the invention, the antennas are each adjusted so that their individual boresights 14, 16 are tilted away from each other a small amount, which for purposes of illustration herein is taken to be $15°$. This may be achieved by tilting each of them $7\frac{1}{2}°$ with respect to the general boresight 18 of the pair, or could be achieved by tilting one of them more or less than the other. Although the invention may be practiced with the antennas tilted toward each other, tilting away is preferred to avoid excessive coupling between them.

Figure 1:
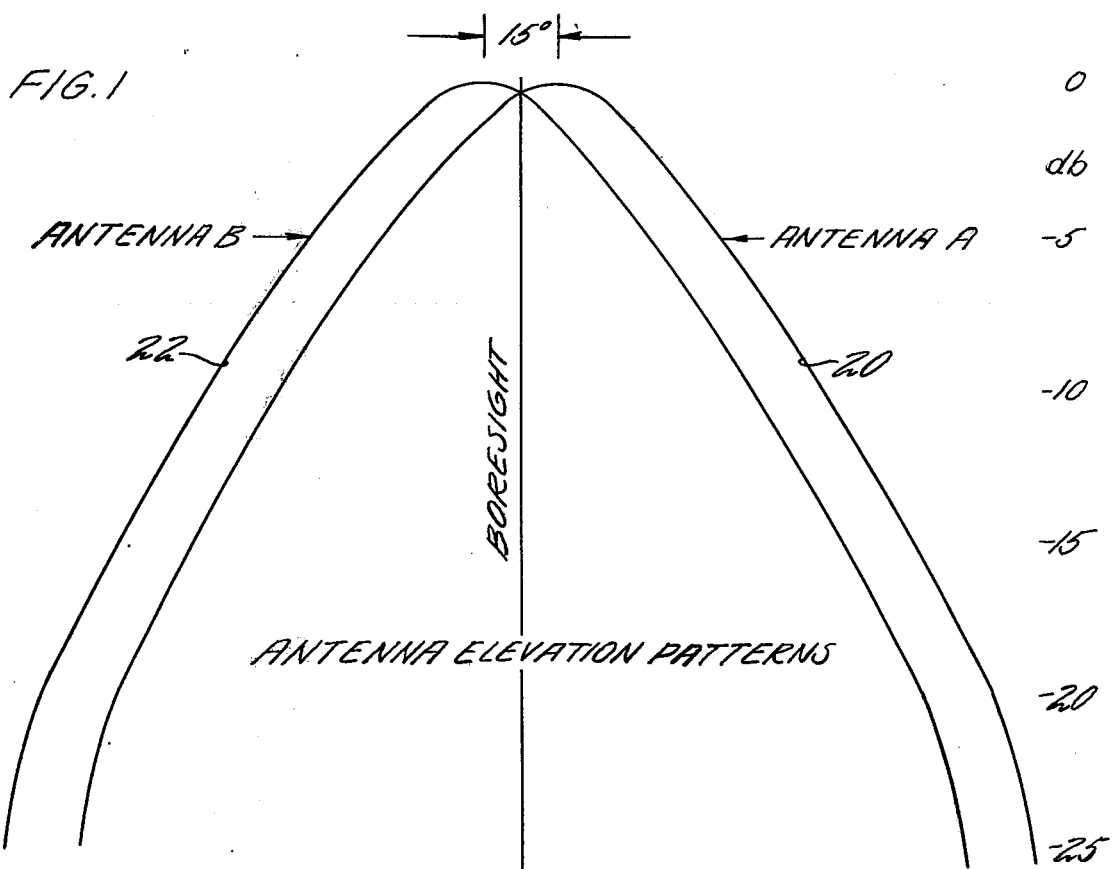
FIG. 1 is a compound illustration of antenna elevation patterns superposed with elevation angles as a function of relative phase and as a function of amplitude differences.
Figure 1:
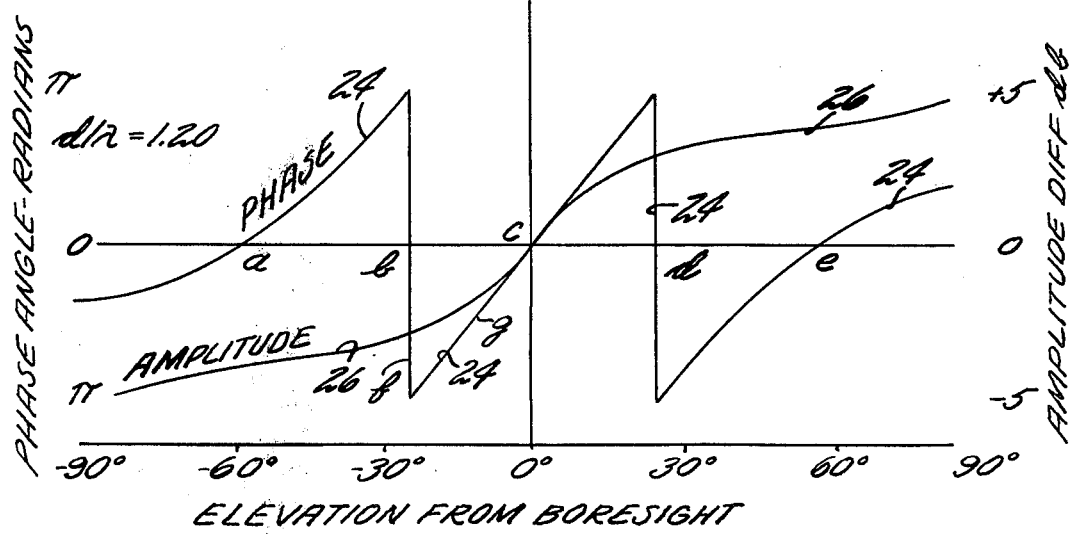

Each antenna will generally provide maximum gain for return signals received along the direction of its boresight, as is plotted in the top of FIG. 1. Therein a plot 20 illustrates the relative gain of the antenna 10 for channel A and the plot 22 illustrates the relative gain of the antenna 12 for channel B. It can be seen that the maximum gain is separated by 15° which is the relative physical tilt of the two antennas. Of course, the actual amount of tilt could be varied to suit any implementation of the present invention. A larger angle would provide a larger amplitude difference and therefore result in greater precision in the determination of elevation angle by amplitude; however, great precision is not required in this case since the determination of elevation angle from relative amplitude is used only to determine acceptable measures of elevation angle from relative phase. On the other hand, too large a separation might result in an error in the phase measurement because of the different degree of limiting in the IF amplifiers. In the examples shown, the maximum difference in the region of interest (approximately ±27°) is approximately 3db.

At the bottom of FIG. 1, a plot 24 illustrates the relationship between the phase difference of the return signals and the elevation angle from boresight in a radar in which the separation between the two antennas 10, 12 (d, FIG. 2) is 1.2 times the wavelength. It can be seen that the elevation angle cannot be resolved since a given phase angle difference can result from targets bearing more than one elevation from boresight. This is due to the fact that for large angles off boresight the phase difference can be separated by more than a complete wavelength; that is, one of the return signals is an entire wavelength or more behind the other return signal in reaching the antenna. Thus, it can be seen that the ambiguity which must be resolved involves selecting only those signals which fall within the permissible range of interest (from about −27° to about +27° off of boresight). This falls within the portion of the curve between points b and d as seen in FIG. 1. The problem is further complicated if the phase detector output (plot 24) does not have a sharp transition from $+\pi$ to $-\pi$ at points b and d but instead, the curve has some finite negative slope over a few degrees of elevation angle.

Consider now the relationship between elevation angle and relative amplitudes of the return waves. This is shown in the plot 26 to be completely monotonic: for any given amplitude difference (shown to the right of the bottom of FIG. 1 in db) there is only one resulting elevation angle. Thus, by comparing phase difference comparison (plot 24) with the amplitude difference and accepting only those phase difference determined to be within certain limits of the amplitude difference, the ambiguity is resolved. This is the feature of the present invention.

Referring again to FIG. 2, the normal receiver, IF amplifiers and limiters, and phase detection, used to determine the phase difference in a phase interferometer radar, are shown within the dashed line 30. The apparatus for comparing the amplitude of return signals of the two antennas, which apparatus is similar to that utilized in the well known amplitude monopulse radar, is shown within the dashed line 32. Apparatus for performing the comparison to select phase angles which fall within points b and d in the bottom of FIG. 1, comprise the remainder of FIG. 2 (the upper right hand corner thereof).

The known phase detecting apparatus 30 comprises a local oscillator 34 which provides a heterodyning signal to a pair of mixers 36, 38 to provide video information at IF frequencies to the IF amplification and limit channels comprising a plurality of amplifiers 40–43 and additional amplifiers and limiting stages which are eliminated herefrom for simplicity. The outputs of the IF amplifier and limiter channels are applied to a phase detector 46 which determines the phase difference, $\phi$, including the sign or sense thereof. The output signal on a line 48 is the normal output of such a detector.

In accordance with the present invention for amplitude comparison of the signals received by the two channels, a pair of signal lines 50, 52 extract amplitude information from the first of the IF stages (at a point in the IF chanell prior to normalization of amplitudes) and feeds these to respective detectors 54, 56. The outputs of the detectors 54, 56 on signal lines 58, 60 are video signals representative of the amplitudes (A, B) of the signals received by the respective channels. These are passed through a sum amplifier 62 and a difference amplifier 64, the output of the sum amplifier being utilized by an automatic gain control circuit 66 so as to control the gain of both amplifiers 62, 64 in a manner such that the output of the amplifier 62 is always constant. Since K (A+B) is constant, then the gain K is equal to a constant divided by A+B. Therefore, the output of the amplifier 64 on a line 68, which is equal to K (A−B), is also proportional to the ratio of the difference of the amplitudes to the sum of the amplitudes: (A−B)/(A+B). As is well known in the art of amplitude monopulse radars, the angle off boresight (elevation angle in this case) is a monotonic function of this ratio. The signal on the line 68 therefore comprises a function of elevation angle determined through return signal amplitude comparison.

The signal on the line 68 may be passed through a function generator 70, if desired, which may be used to provide a constant scale factor to the signal on the line 68, or it may be used to provide controlled distortion of the function so as to cause it to more nearly resemble the relationship of elevation angle to phase difference between the points b and d (in the bottom of FIG. 1) so as to facilitate comparison between them. On the other hand, should this prove unnecessary in any given implementation of the invention, the function generator 70 may be eliminated.

Referring again to the bottom of FIG. 1 it can be seen that there is a point f and a point g where the amplitude and phase determinations of elevation angle differ from each other by about the same amount. To eliminate the point f, only phase differences which are less negative than the phase difference of a previously received target return for each transmitted pulse is recognized. The output of the phase detector 48, which represents the difference in phase between the two return waves, is passed through a first gate circuit 72 only if the current phase angle, $\phi$, is less negative than the most negative phase angle of any previous target return from the same transmitted pulse. Since the point f is more negative than any other point on the curve which could occur between −90° (vertically below the antenna) and point f, it could not pass the test. But since the point g is a less negative angle than points (such as point f) below point b, the phase represented at point g could pass this test. Similarly, after passing the point d, the phase plot 24 becomes increasingly negative until the value of $\theta$ determined by phase is significantly different from that determined by amplitude so it would fail the comparison test. This is achieved in accordance with the present invention in FIG. 2 by a negative peak hold circuit 74 which may comprise, for instance, an integrating amplifier having a time constant which is large with respect to the pulse repetition frequency of the radar which senses the most negative phase relationship for each transmitted pulse. The negative peak hold circuit 74 may be conveniently reset at the pulse repetition frequency, such as by a signal from the master oscillator which controls transmission of the rf signals. As is known, the PRF may typically be on the order of several thousand Hz. The output of the negative peak hold circuit 74 is applied to a first compare circuit 76 so that the instantaneous phase can be compared with the most negative previously received phase. The time element of this comparison is based on the fact that for each pulse transmitted by the radar, those pulses which traverse in a vertical direction (directly below the aircraft) and return therefrom do so the soonest. For reflections that occur at greater and greater ground range distances away from the aircraft, the return signals are received at later and later times. Thus, the return waves will always return first from the greatest or most negative angles below boresight, and will return from successively more positive angles at later times. The output of the first compare circuit 76, in the case where the signal on the line 48 is a less negative phase than that previously stored in the negative peak hold circuit 74, will energize the first gate 72 so as to pass the signal on the line 48 through to a line 78. This signal is compared with the signal on a line 80 from the amplitude function apparatus 32 in a second compare circuit 82. When the two signals are close enough to each other, the second compare circuit 82 will operate a second gate circuit 86 so as to pass the phase difference ($\phi$) on line 78 to an arc sin generator 88, which provides the elevation angle ($\theta$) as $\theta =$ arc sin $\lambda/2 \pi d\phi$, to an elevation angle output signal line 88.

The ratio of the difference to the sum is very nearly the same as the difference expressed in db, as plotted in the bottom of FIG. 1. Any difference is immaterial since the sole essence herein is to adjust the second compare circuit 82 to operate the second gate circuit 86 when the ratio is close enough to the positively-related phase signal from the first gate. This is done in accordance with known comparison techniques to suit the parameters of any implementation of the present invention.

Thus, it can be seen that the embodiment of the present invention shown in FIG. 2 comprises means (34–41) providing return signals from a pair of antennas (10, 12) displaced from each other and mutually tilted in a plane within which an elevation angle is to be measured; means responsive thereto (42–46) to generate a signal indicative of the difference in phase in the return signals; means (72–76) to pass only signals representative of phase differences having a positive slope means (50–70) for generating a signal as a function of the difference of the amplitudes of the two return signals; means (82) for comparison of the signals representative of phase difference with the signals representative of amplitude difference; and means (86) for selectively transmitting only those signals representative of phase differences which are within prescribed limits of those signals representative of amplitude differences. And it further includes means (88) responsive to the transmitted phase for generating a signal indicative of depression angle of a target as a function of the phase difference.

The embodiment of FIG. 2 compares phase difference with a function of amplitude difference. However, if desired, the depression angle, $\theta$, may be generated at the output of the phase detector 46 instead of at the output of the second gate 86, and it may thereafter be tested to be sure that it has a positive slope, using substantially the same apparatus 72–76. In such a case, the function generator 70 may provide the functions of the well-known amplitude monopulse radar to provide an angle $\theta$ on the line 80 and compare the two angles per se in the second compare circuit 82. The same result can be achieved in that fashion. Thus, the true nature of the present invention is in providing some function of amplitude difference which can be compared against a function of phase difference, even if that function is the elevation angle, to ensure that only elevation angles generated from correct phase differences are utilized.

It should be noted that the first gate means 72 and its associated circuits 74, 76 are provided to avoid ambiguity as between the points f and g (bottom of FIG. 1) which is required only if there is a finite slope of phase difference against true elevation angle, which is likely to be true with today's technology. However, in a system where the rate of change of phase angle difference to true elevation angle is substantially infinite as it goes from phase angles of $\pi$ to $-\pi$, then there is no need for detecting the positive slope aspect since areas of the curve to the left of point b in FIG. 1 and to the right of point d in FIG. 1 are readily eliminated by the comparison with the amplitude function signals. Thus the invention may be practiced without determining a positive relationship between the function of phase angle and true elevation angle in appropriate circumstances.

Further, it would be within the scope of the invention to utilize a different means for determining when the phase difference has a positive relation to angle, other than determining when it is less negative than the most negative phase difference; this same area of the curve (between points b and d) can be equally well defined as being an area of the curve where the slope is positive.

Although the invention has been shown and described with respect to a preferred embodiment thereof, it should be understood by those skilled in the art that the foregoing and various other changes and omissions in the form and detail thereof may be made therein without departing from the spirit and the scope of the invention.

Having thus described a typical embodiment of my invention, that which I claim as new and desire to secure by Letters Patent of the United States is:

1. In a phase interferometer radar elevation angle measuring system, the combination comprising:
   receiver means, including a pair of antennas, relatively displaced and tilted in a plane within which elevation angles to radar targets are to be determined, for presenting a pair of time varying signals representing target return signals received by the respective antennas;
   phase means responsive to said receiver means for generating a phase function signal as a function of the phase difference between said pair of signals;
   amplitude function means responsive to said receiver means for generating an amplitude function signal as a function of the difference of the amplitudes of said pair of signals; and gate means responsive to said phase function signals generated by said phase means and to said amplitude function signals generated by said amplitude means for comparing said phase function signals with said amplitude function signals and for presenting signals representing elevation angles to targets in response to related ones of said phase function signals being within prescribed limits of corresponding ones of said amplitude function signals.

2. The combination according to claim 1 wherein said phase means additionally comprises:

phase function selection means for sensing phase function signals having a positive rate of change and for passing to said gate means only phase function signals which have a positive rate of change.

3. The combination according to claim 2 wherein said phase function selection means comprises:

means responsive to said phase function signal for sensing the largest magnitude of said phase function signals of a sense relating to elevation angles below boresight, and for passing ones of said phase function signals of a lesser magnitude of said sense, or of an opposite sense.

4. The combination according to claim 1 wherein said amplitude function means comprises:

means providing said amplitude function signal as a function of the ratio of the difference in the amplitudes to the sum of the amplitudes of said pair of signals.

5. In a phase interferometer radar elevation angle measuring system, the combination comprising:

receiver means, including a pair of antennas, relatively displaced and tilted in a plane within which elevation angle to radar targets is to be determined, for presenting a pair of time varying signals representing target return signals received by the respective antennas;

phase means including phase detection means responsive to said receiver means for generating phase signals representing phase differences between said pair of signals;

amplitude means responsive to said receiver means for generating an amplitude signal as a function of the differences of the amplitudes of said pair of signals;

elevation means for generating signals representing elevation angles to targets in response to related phase signals received thereat; and gate means responsive to phase signals generated by said phase means and to amplitude signals generated by said amplitude means for comparing said phase signals with said amplitude signals and for passing said phase signals to said elevation means in response to said phase and amplitude signals being within prescribed limits of one another.

6. The combination according to claim 5 wherein said phase means additionally comprises:

phase selection means responsive to said phase detection means for sensing phase signals representing phase differences having a positive rate of change and for passing said positive rate of change phase signals to said gate means.

7. The combination according to claim 6 wherein said phase selection means comprises:

means responsive to said phase detection means for sensing the largest phase difference of a sense representing elevation angles below boresight, and for passing ones of said phase signals of a lesser magnitude of said sense, or of an opposite means.

8. The combination according to claim 5 wherein said amplitude means comprises:

means providing said amplitude signal as a ratio of the difference in the amplitudes to the sum of the amplitudes of said pair of signals.

* * * * *

UNITED STATES PATENT AND TRADEMARK OFFICE
CERTIFICATE OF CORRECTION

PATENT NO. : 4,170,774
DATED : October 9, 1979
INVENTOR(S) : Carl F. Schaefer

It is certified that error appears in the above-identified patent and that said Letters Patent are hereby corrected as shown below:

Column 2, line 33    "avoid" should read --avoids--

Column 4, line 16    "chanell" should read --channel--

Column 8, line 32    "means" should read --sense--

Signed and Sealed this

Twenty-third Day of September 1980

[SEAL]

Attest:

SIDNEY A. DIAMOND

Attesting Officer    Commissioner of Patents and Trademarks